ELECTRIC RECTIFYING DEVICES EMPLOYING SEMICONDUCTORS

Filed Oct. 7, 1953 2 Sheets-Sheet 1

Inventor
K.A.MATTHEWS- R.A.HYMAN
By Philip M. Bolton
Attorney

ELECTRIC RECTIFYING DEVICES EMPLOYING SEMICONDUCTORS

Filed Oct. 7, 1953 2 Sheets-Sheet 2

Inventor
K.A. MATTHEWS-RAHYMAN
By Philip M. Bolton
Attorney

United States Patent Office 2,713,132

Patented July 12, 1955

2,713,132

ELECTRIC RECTIFYING DEVICES EMPLOYING SEMICONDUCTORS

Kenneth Albert Matthews and Robert Anthony Hyman, London, England, assignors to International Standard Electric Corporation, New York, N. Y.

Application October 7, 1953, Serial No. 384,578

Claims priority, application Great Britain October 14, 1952

10 Claims. (Cl. 317—236)

The present invention relates to electric crystal rectifiers.

The invention concerns an improvement in or modification of the invention described and claimed in the specification of co-pending U. S. application No. 302,065, filed August 1, 1952. The present application is a continuation-in-part of the above application.

The usual form of a crystal rectifier comprises a crystal of germanium or silicon or other suitable semiconductor, mounted on a metal base or holder, and having in contact with its surface a pointed wire or cat whisker. It is well known that the reverse resistance characteristic of rectifiers of this kind often has a portion where the resistance is negative, and advantage of this circumstance may be taken to use a crystal rectifier to generate oscillations, or to provide simple triggering arrangements.

In the case of high resistivity germanium crystal rectifiers, which are very efficient rectifiers for ordinary purposes, the negative resistance region is not reached until the applied reverse voltage is rather high, for example, about 100 volts, and the current at the first turnover point where the resistance changes sign is high, usually greater than 5 milliamperes. Furthermore, the resistance corresponding to the negative slope is small.

Thus, when it is desired to make use of the negative resistance property, for example when the device is used to generate oscillations, or in a trigger circuit, a reverse voltage of nearly 100 volts must be applied. The corresponding current may be perhaps 5 to 10 milliamperes, and so considerable power is dissipated which results in serious heating at the rectifier contact which in turn modifies the rectifier characteristics.

The voltage-current characteristic curve for the reverse or high resistance direction of such rectifiers for increasing currents has a first portion with a positive slope connected by a first turnover point (at which the incremental resistance of the rectifier passes through zero) with a second portion with a negative slope, which in turn is connected by a second turnover point (at which the incremental resistance again passes through zero) with a third portion having again a positive slope.

The principal object of the present invention is to provide a crystal rectifier in which the incremental resistance corresponding to the negative slope portion of the characteristic is large, while at the same time the current corresponding to the first turnover point is small.

A further object is to reduce the voltage corresponding to the second turnover point, and to reduce the incremental resistance corresponding to the third portion of the characteristic curve.

The object of the parent invention, rather more briefly stated in the parent specification, was similar, and was achieved according to one aspect by providing an electric crystal rectifier comprising a semiconducting body of given conductivity type and having on its surface a layer of the opposite conductivity type, an electrode making low resistance non-rectifying contact with part of the said layer, a thin film of the given conductivity type over a limited area of another part of the said layer, and a second electrode making a rectifying contact with the said thin film, the two electrodes being spaced apart by a distance which lies between 0.001 and 0.01 inch.

Recent experience has thrown more light on the behaviour of rectifiers having close spacing between the electrodes. While it was known that the spacing of the electrodes depends somewhat on the properties of the semiconductor and its treatment, it has been found that when germanium of greater purity is used very much larger spacings than those indicated in the parent specification become possible.

The action results from the fact that minority current carriers are fed into the semiconductor by the first-mentioned electrode (usually called the "base" electrode) and the carriers are collected by the second electrode (usually a cat whisker), and greatly modify the reverse characteristic. By the electro-forming treatment referred to in the parent specification, the energy level characteristic of the second electrode is made to be similar to that for the collector electrode in a transistor shown in Figs. 4–13 on page 112 of the textbook entitled "Electrons and Holes in Semiconductors" by W. Shockley, published by the D. Van Nostrand Co., 1950. The minority current carriers collected by the second electrode produce a regeneration effect.

When an N-type semiconductor is employed and the rectifier is biased in the reverse direction, the minority current carriers referred to above are electron deficiencies, calld "positive holes," and in the case of a P-type semiconductor, they are electrons. The carriers take appreciable time to reach the second electrode, and they also tend to recombine, so that the spacing between the electrodes must be such that appreciable numbers of carriers are able to reach the second electrode before they have recombined. The spacing therefore depends on the "lifetime" T of the carriers, which depends on the properties of the semiconductor, and is practically unaffected by the electroforming treatment mentioned above. If N is the number of extra carriers present per cubic millimetre of the semiconductor at zero time, and $n$ is the number at time $t$ seconds after zero time, then the bulk lifetime T in seconds is defined by the formula $n=Ne^{(-t/T)}$. It should be pointed out, however, that this formula is only approximate if surface effects are taken into account. The lifetime T may, however, be determined experimentally by known methods from a sample of the semiconductor to be used. See for example Shockley's book already referred to, paragraph 3.1d, page 66.

The purpose of the present invention is to cover rectifiers fulfilling the above-stated objects in addition to those, and operating on the same principles as those, covered by the parent specification.

According to the present invention, there is provided an electric crystal rectifier comprising a semiconducting body of given conductivity type, a first electrode making low resistance contact with the said body, the said body having been subjected to an electroforming treatment in order to produce a layer of the opposite conductivity type on part of the exposed surface of the body, and a thin film of the given conductivity type over part of the said layer, and a second electrode making contact with the said thin film, the two electrodes being spaced apart by a distance $d=k\sqrt{T}$, where T is the lifetime of current carriers in the semiconducting body, and $k$ is substantially a constant, the value of which depends upon the said electroforming treatment, and upon the reverse turnover voltage required for the rectifier.

The invention also provides an electric crystal rectifier comprising a semiconducting body of N-type conductivity, a first electrode making low resistance contact with the said body, the said body having been subjected to an electroforming treatment in order to produce a layer of P-type conductivity on part of the exposed surface of the body, and a thin film of N-type conductivity over part of the said layer, and a second electrode making contact with the said thin film, the two electrodes being spaced apart by a distance $d=k\sqrt{T}$, where T is the lifetime of positive holes in the semiconducting body, and $k$ is substantially a constant, the value of which depends upon the said electroforming treatment and upon the reverse turnover voltage required for the rectifier.

The present invention will be described with reference to the accompanying drawings in which.

Figures 1, 1A, 2, 3, 4, 5, 6, 7, 8, 9, 10:
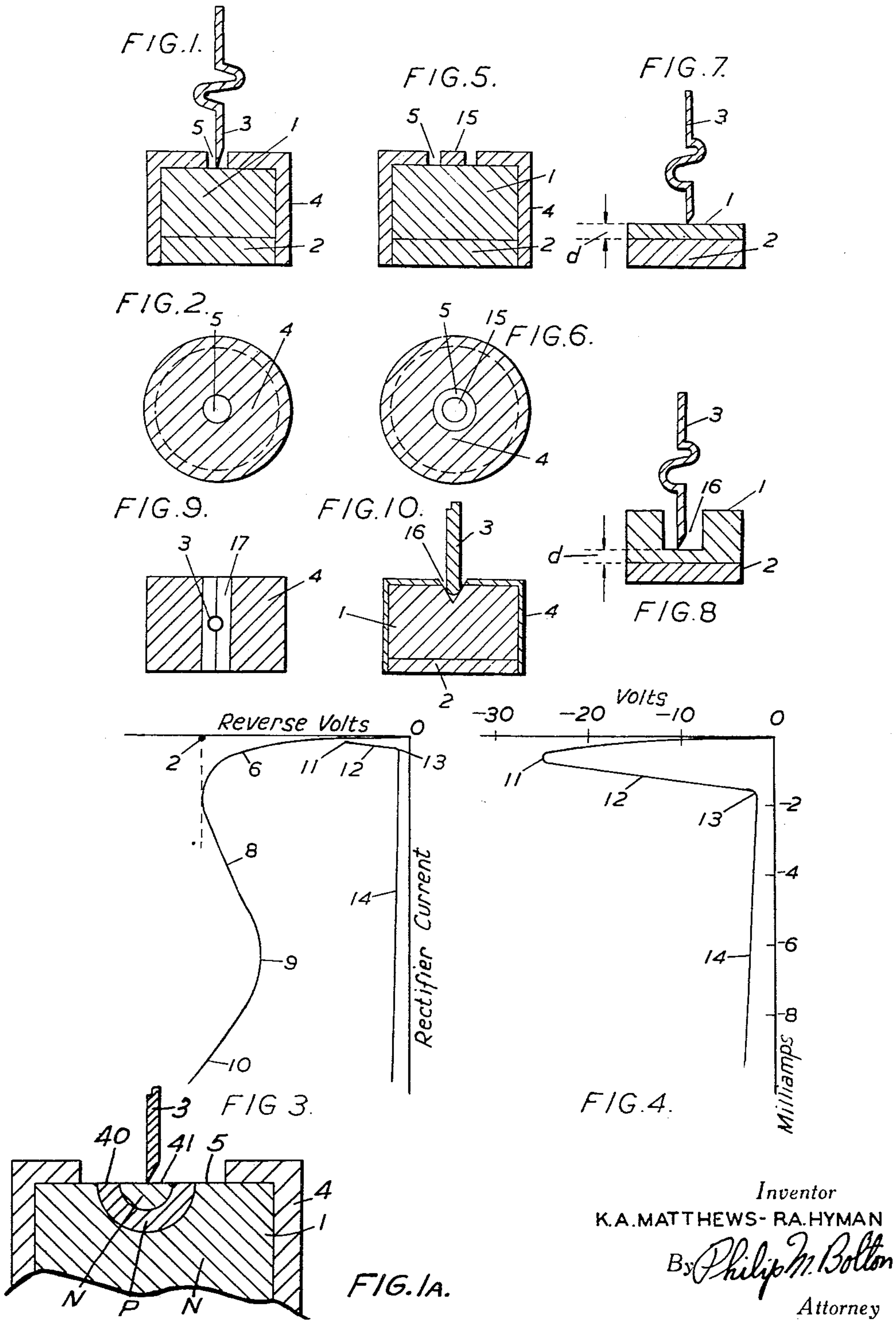
Fig. 1 shows a section of a crystal rectifier according to the invention.
Fig. 1A shows part of Fig. 1 to a larger scale.
Fig. 2 shows a top view of the rectifier with the cat-whisker removed.
Fig. 3 shows a characteristic curve illustrating the process of electroforming the rectifier.
Fig. 4 shows part of Fig. 3 to a larger scale.
Fig. 5 shows a section of another form of crystal rectifier according to the invention.
Fig. 6 shows a top view of the rectifier of Fig. 5.
Fig. 7 shows in section a modification of the rectifier illustrated in Figs. 1 and 2.
Fig. 8 shows a modification of Fig. 7.
Fig. 9 shows a section of still another form of rectifier according to the invention.
Fig. 10 shows a top view of the rectifier of Fig. 7.

The rectifier shown in Figs. 1 and 2 comprises a slice or disc 1 of an N-type semiconducting crystal, such as an N-type germanium crystal, cemented or soldered or otherwise firmly attached to a metal base electrode 2 and making a low resistance contact therewith.

The upper surface of the crystal should be treated in the conventional manner to enhance the rectification properties, for example, by first polishing the surface and then etching with a solution containing hydrofluoric acid, nitric acid and copper nitrate. A fine, sharply pointed, wire or cat whisker 3 makes contact with the upper face of the crystal slice. The cat whisker is shown formed into an S-shape to provide some resilience.

The base electrode 2 is effectively extended over to the upper surface of the crystal slice by means of a plated coating 4 which covers the edges of the base electrode 2 and the whole exposed surface of the crystal slice, except for a small hole 5 through which the point of the cat whisker is able to make contact with the surface of the crystal. The size of the hole 5 is not important, but the point of the cat whisker 3 should be placed within a distance of the edge of the coating 4 depending on the quality of the germanium crystal, as already explained, and this matter will be dealt with more fully below.

It is necessary to apply between the cat whisker 3 and the coating 4 a direct current electroforming treatment, for example, similar to that described on page 370 of the textbook "Crystal Rectifiers" by H. C. Torrey and C. A. Whitmer, published by the McGraw-Hill Book Company Inc., 1948. The material of the cat whisker 3, however, should contain a small quantity of a donor type impurity such as arsenic or phosphorus, and the electroforming treatment should be carried out with the cat whisker 3 negative to the coating 4.

Fig. 3 shows the relation between the voltage applied between the cat whisker 3 and the coating 4 in the reverse or high resistance direction, and the resulting current through the rectifier. The curve, before electroforming, follows the line 6, corresponding to a relatively high reverse resistance, until a critical voltage, 7, called the "turnover voltage," is reached, when the curve turns round and follows a portion 8 with a negative slope. As the current through the rectifier is allowed to increase after the turnover point the voltage across the rectifier continues to fall until the negative resistance effect disappears at a second turnover point 9 and the slope of the curve again becomes positive as indicated by the portion 10. This curve is, of course the usual curve which will generally be found to apply to rectifiers formed by point contacts of semiconducting crystals such as germanium.

In the case of germanium, the turnover voltage corresponding to the point 7 is often of the order of 100 volts, and the corresponding current is often 5 milliamperes or more. Also the slope of the portion 8 is rather steep, indicating that the value of the negative incremental resistance is small. It will further be noted that the voltage corresponding to the second turnover point 9 is not very much less than the voltage at the first turnover point.

After electroforming in the manner described, it will be found that the curve is greatly altered. The new curve follows the portion 6 as far as the first turnover point 11 which occurs at a much lower voltage than the critical voltage 7. The following negative resistance portion 12, corresponding to 8, is very much less steep, indicating a much higher value for the negative incremental resistance, and the second turnover point 13 occurs at a voltage which is a fraction (e. g. less than one-tenth) of the voltage corresponding to the first turnover point 11. Finally the positive resistance portion 14 corresponding to 10 is very steep, indicating a very low incremental resistance.

Fig. 4 shows the curve of one example of an electroformed rectifier to a larger scale with the voltage and current values given to indicate the order of the results obtained in a particular case. The turnover points 11 and 13 occur at about 25 and 2 volts respectively, and the current at the point 11 is less than 1 milliampere. The actual values depend on the distance $d$ between the electrodes as will be explained later. The slope of the portion 12 corresponds to a negative incremental resistance of the order of 20,000 ohms, while the incremental resistance corresponding to the portion 14 may be of the order of 10 ohms or less. On the scale of Fig. 4, the portion 14 would thus appear practically parallel to the current axis, so the slope has been decreased in order to make the character of the curve clear. As will appear later, a rectifier with a curve of the form shown in Fig. 4 is convenient for use in trigger circuits.

The current which passes during the electroforming treatment heats a small area of the surface of the N-type crystal 1 (see Fig. 1A) in the immediate neighbourhood of the point of the cat whisker 3, and it has been shown that the effect of this is to convert a small layer 40 under the whisker point to P-type conductivity and at the same time to inject some of the donor impurity (such as arsenic or phosphorus) from the cat whisker 3, so that there is superimposed on the P-type layer a thin film 41 of N-type conductivity. The cat whisker 3 is in contact with the N-type film 41, and by this means is given the energy level characteristic referred to above.

It has already been explained that the spacing necessary for the electrodes 3 and 4 depends on the lifetime T of the current carriers fed to the surface of the semiconductor by the electrode 4. In order to produce the first turnover point 11 of the characteristic curve (Fig. 4) a sufficient number of minority carriers must reach the electrode 3, and this number of carriers depends both on the spacing $d$ between the electrodes and on the applied voltage. The voltage corresponding to the turnover point 11 (the turnover voltage) increases as $d$ decreases.

It can be shown that the relation between the spacing $d$ for a given turnover voltage and the lifetime T of the minority current carriers is given by $$d=k\sqrt{T}$$

where $k$ is substantially a constant.

The constant $k$ depends on the nature of the energy level characteristic of the rectifier produced by the electroforming treatment which has been applied. Its value is most conveniently determined experimentally by measurements on a sample of the semiconductor to be used, which sample has been subjected to the particular electroforming treatment which will be employed for the rectifiers to be manufactured. As already mentioned the lifetime T will have been determined from this sample.

After the sample has been electroformed, a curve is obtained similar to Fig. 4 relating the rectifier current to the voltage applied between the cat whisker electrode and an additional movable probe electrode. By placing the probe electrode at various distances from the cat whisker, the relation between $d$ and the corresponding turnover voltage can be determined. Thus the constant $k$ can be found corresponding to a given turnover voltage after electroforming, and it is found that this constant $k$ is independent of the particular sample of semiconductor used.

The distance $d$ for a given turnover voltage may then be determined for a sample of the semiconductor having any value of T by means of the formula $d=k\sqrt{T}$.

In the form of the invention shown in Figs. 5 and 6 the cat whisker 3 is replaced by a metal film electrode 15 of small area which is plated or otherwise deposited on the surface of the crystal in some suitable way. The electrode 15 occupies part of the area of the hole 5 and its edge should be spaced from the nearest edge of the coating 4 by a distance $d$ determined by the formula given above. The electrode need not be in the centre of the hole and need not be circular. A suitable terminal conductor wire (not shown) may be soldered or otherwise firmly attached to the electrode 15.

It is not essential to provide the metal base 2 or the cylindrical portions of the coating 4. This electrode may consist simply of the portion on the top surface of the crystal slice, and it need not cover the whole area thereof. It is only essential that it should make a low resistance contact with the crystal, and that the cat whisker or other rectifying electrode should be placed close to the edge of the coating or base, as explained above. After electroforming in the manner described some of the impurity is driven into the surface layer of the crystal, and reduces the turnover voltage as already explained.

As shown in Fig. 7, the coating 4 shown in Fig. 1 is not essential if the lifetime T of the minority current carriers is sufficiently long. In Fig. 7, a very thin crystal slice 1 is secured to a metal base electrode 2 so that a low resistance contact is obtained, and the cat whisker 3 makes contact with the upper surface. According to the invention, appropriate spacing between the cat whisker 3 and the base electrode 2 will be obtained by choosing the thickness $d$ of the crystal slice in accordance with the formula given above. If, however, the lifetime T of the minority current carriers is relatively small, the crystal slice may have to be impracticably thin, and then one of the previously described arrangements, or that illustrated in Figs. 9 and 10, to be described later, will have to be adopted. A modification of Fig. 7, shown in Fig. 8, may however be a satisfactory alternative. In this case, a relatively thick crystal slice 1 has a slot or recess 16 cut in it to such a depth that the thickness $d$ of the bottom of the slot or recess is in accordance with the formula given above. The cat whisker 3 then makes contact with the bottom of the slot or recess 16, as shown. The electroforming treatment already described must, of course, be applied to the rectifiers shown in Figs. 7 and 8. The cat whisker 3 may be replaced by a thin metal film electrode, as in Figs. 5 and 6.

Figs. 9 and 10 show another convenient form of a rectifier according to the invention. A rectangular crystal 1 of N-type germanium is provided with the usual base electrode 2 and the whole surface of the crystal is covered by a thin metal coating 4 deposited by electroplating or evaporation. The crystal need not be rectangular, but could, for example, be circular. A V-groove 17 is then cut or ground through the upper surface of the coating and into the crystal. The exposed surfaces of the crystal in the groove are then etched, for example with the etching solution mentioned above, and a cat whisker 3 with spherical point is then placed in the groove as shown in Fig. 9. The electroforming treatment already described is then carried out.

The spacing between the contact points of the cat whisker 3 and the edges of the coating 4 may be precisely fixed by suitably dimensioning the groove and the diameter of the cat whisker. In Fig. 10 the plated areas of the top surface of the crystal have been shaded.

Figures 11, 12, 14:
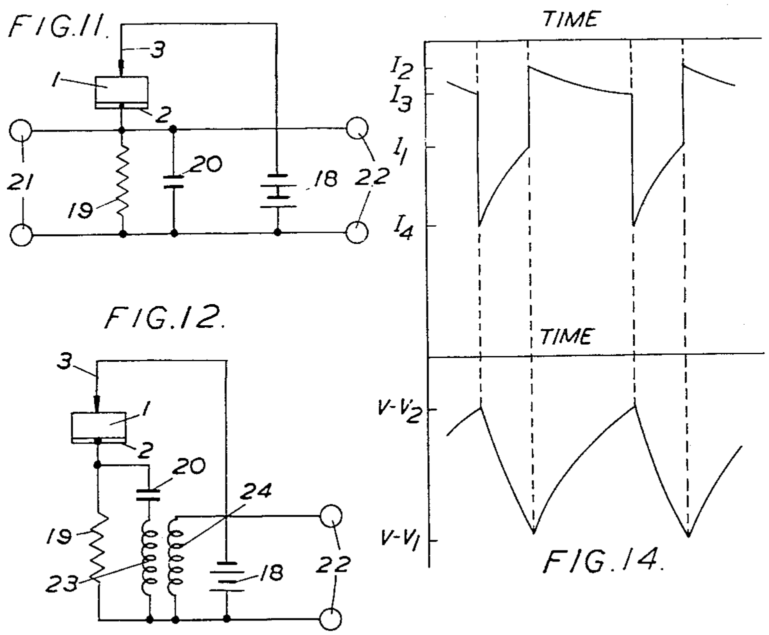
Figs. 11 and 12 show two examples of the use of a rectifier according to the invention in trigger or oscillation circuits.
Figs. 13 to 15 show diagrams used in explaining the operation of the circuit of Fig. 11.

Figs. 11 and 12 show examples of two circuits in which rectifiers according to the invention may be used. Fig. 11 is a trigger or relaxation oscillator circuit which can operate in one of three possible modes according to the adjustments. Fig. 12 is sine-wave oscillation generator. In Fig. 11, the rectifier, similar for example to that of Fig. 1, is shown diagrammatically. The cat whisker electrode 3 is connected to the negative terminal of a direct current source 18, and the base electrode 2 is connected to the positive terminal of the source 18 through a load resistor 19. A capacitor 20 shunts the resistor 19. Two input terminals 21 for a source of triggering potential (not shown) are respectively connected to the terminals of the resistor 18, and also a pair of output terminals 22. Fig. 12 differs from Fig. 11 in that the primary winding 23 of a transformer is connected in series with the capacitor 20, the output terminals 22 being connected to the secondary winding 24; and the input terminals 21 are omitted.

Figure 13:
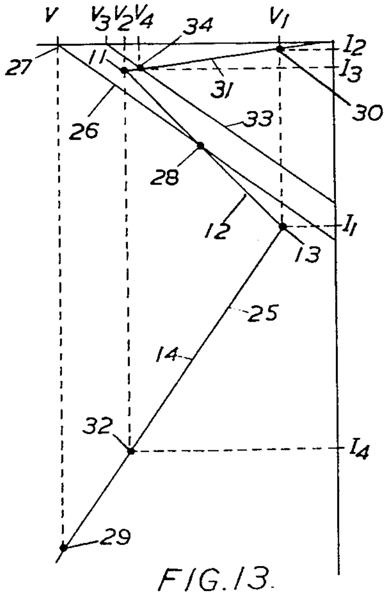
Figure 15:
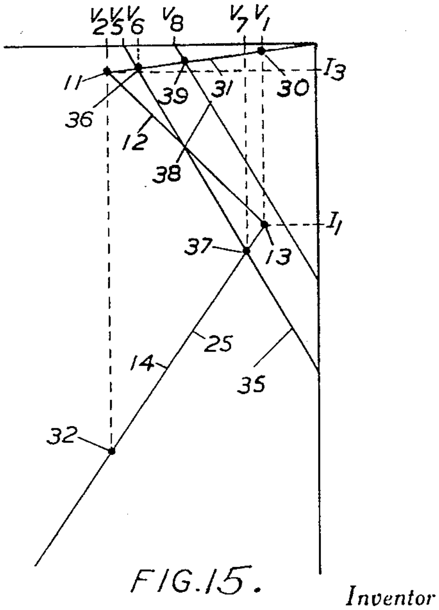

The operation of Fig. 11 will first be explained with reference to Figs. 13, 14 and 15. In Figs. 13 and 15 the characteristic curve of the rectifier according to the invention is shown in diagrammatic or conventional form so as to exhibit the material characteristics without indicating details. The three modes of operation of the circuit of Fig. 11 may be described as:

(1) Astable; that is, the circuit will not remain stable in any condition and generates relaxation oscillations.

(2) Monostable; that is, the circuit has one condition of current and voltage in which it will remain indefinitely. By the application of an appropriate triggering potential it will execute a single cycle of oscillation, and a corresponding output pulse can be obtained.

(3) Bistable; that is, the circuit has two different conditions of current and voltage in either of which it will remain indefinitely. By the application of appropriate triggering voltages, it may be switched from one condition to the other, and vice versa.

Which of these three modes is obtained depends on the values chosen for the load resistor 19 and the potential of the source 18.

In Fig. 13, 25 is the conventionalised characteristic curve of the rectifier, the abscissae and ordinates respectively representing, as before, the voltage of the electrode 3 with respect to the electrode 2, and the current flowing from 3 to 2, both of which are negative. The straight line 26 is a load line for the resistor 19, and represents relation between the current flowing therethrough and the difference between the constant potential V of the source 18 and the potential drop across the resistor 19 produced by the current. The line 26 cuts the axis of abscissae at the point 27 corresponding to the potential V of the source 18, and a point where it cuts the characteristic curve 25 represents a possible current and voltage condition for the circuit.

The line 26 has been drawn in such manner that it cuts the curve 25 in a single point 28 on the negative resistance portion 12 of the curve. This will produce the first or astable mode, because the point 28 represents an unstable condition, and the circuit will generate relaxation oscillations of frequency and form depending on the capacity of the capacitor 20 (Fig. 11). These oscillations can be obtained from the output terminals 22.

If the capacitor 20 be supposed to be initially uncharged, on connecting the source 18, the current through the rectifier will assume the value corresponding to the point 29 on the portion 14 of the curve. The capacitor immediately begins to charge, and the current through the rectifier falls, the portion 14 of the curve being traced as far as the second turnover point 13. At this point the unstable condition occurs, and the current jumps suddenly from the value $I_1$ at the point 13 to the much smaller value $I_2$ at the point 30 on the initial positive resistance portion 31 of the curve, the capacitor 20 meanwhile holding the potential across the rectifier constant at the value $V_1$ corresponding to the point 13.

The rectifier now having a much higher resistance than before, the capacitor begins to discharge again, and the portion 31 of the curve is followed up as far as the first turnover point 11. Again the unstable region is reached, and the current jumps from the value $I_3$ at the point 11 to the much higher value $I_4$ corresponding to the point 32, the capacitor again holding the potential across the rectifier constant, at the value $V_2$ corresponding to the point 11. The capacitor 20 then starts charging up again, and the portion 14 of the curve is followed to the point 13, and the process is thereafter repeated, the cycle 13, 30, 11, 32, 13 being described indefinitely. Fig. 14 shows the variations with respect to time of current through the rectifier, and of the potential of the upper terminal 22 with respect to the lower terminal, which is the same as the potential across the capacitor 20. It will be evident that this potential varies between the limits $V—V_1$ and $V—V_2$.

It will be evident also that in order to produce the condition in which the load line 26 (Fig. 13) cuts the curve 25 in the single point 28 lying on the negative resistance portion 12, the slope of the line 26 must be less than that of the portion 12. This means that the resistance of the resistor 19 (Fig. 11) must be greater than the magnitude of the negative resistance corresponding to the portion 12.

If now the potential of the source 18 (Fig. 11) be reduced to a lower value $V_3$ without changing the value of the resistor 119, a new load line 33 (Fig. 13) parallel to 26 can be obtained which cuts the curve 25 in a single point 34 corresponding to a voltage $V_4$ lying on the positive resistance portion 31. This now represents a stable condition of the circuit. If now a negative pulse of amplitude slightly exceeding $V_2—V_4$ be applied at the upper terminal 21 (Fig. 11), the circuit will be triggered beyond the first turnover point into the unstable region, and a single cycle 34, 11, 32, 13, 30, 34 will be described, the circuit ending up in the stable condition represented by the point 34. This is the second or monostable mode of operation of the circuit. A pulse of amplitude substantially equal to $V_2—V_1$ can then be obtained from the upper terminal 22.

It will be evident that another monostable condition could be produced by increasing the potential of the source 18 somewhat above the value V, so that the load line (not shown) cuts the curve 25 in a single point in the portion 14. The circuit can then be triggered by a positive pulse applied at terminal 20 and will execute a single cycle as before.

Referring now to Fig. 15, a load line 35 for the resistor 19 has been drawn to cut the curve 25 in three points. The slope of the load line 35 must evidently be greater than the slope of the portion 12, which means that the value of the resistor 19 must be less than the magnitude of the negative resistor represented by the portion 12. This choice produces the bistable mode. The points 36, 37 where the line 35 cuts the portions 31 and 14 of the curve 25 both represent stable conditions of the circuit. In this case $V_5$ is the voltage of the source 18 and $V_6$ and $V_7$ the voltages corresponding to the points 36 and 37. If the circuit be supposed to be in the first stable condition represented by the point 36, and a negative triggering voltage slightly greater than $V_2—V_6$ be applied at the upper terminal 21 (Fig. 11), the circuit will be triggered to the second stable condition represented by the point 37, the course followed being 36, 11, 32, 37. If now a positive triggering voltage slightly greater than $V_7—V_1$ be applied at the upper terminal 21, the circuit will be triggered back to the first condition represented by the point 36, the course followed being 37, 13, 30, 36. The current change produced by the triggering is in both cases greater than $I_1—I_3$. If the inclination of the line 35 be increased (that is, the resistor 19 is reduced), the point 37 can be placed much lower down on the portion 14, and the current change will be much greater. Reference to the curve shown in Fig. 4 makes it clear that the current change can easily be made several times greater than $I_1—I_3$.

If the voltage of the source 18 be further reduced below $V_5$ to a value $V_8$ (without changing the value of the resistor 19) it can be seen from Fig. 15 that the new load line 38 can be arranged to cut the curve 25 in only one point 39 on the portion 31, which produces again the monostable mode already described. Evidently also a higher value for the voltage of the source 18 greater than $V_2$ could be found such that the corresponding load line (not shown) cuts the curve 25 in a single point on the portion 14, producing again a monostable mode. Thus it will be seen that the monostable mode can be produced by suitable choice of the voltage of the source 18 whether the resistor 19 is greater or less than the negative resistance represented by the portion 12 of the characteristic curve 25.

For the operation of the oscillation generator shown in Fig. 12, the conditions should be chosen to produce a load line similar to 26 of Fig. 13. The circuit will then generate oscillations whose frequency is largely determined by the resonance frequency of the capacitor 20 and the windings 23 and 24 of the transformer, but depends also on the characteristics of the rectifier and of the output circuit connected to terminals 22. Oscillation frequencies of at least 1 megacycle per second have been obtained with this circuit.

While the principles of this invention have been described above in connection with specific embodiments, and particular modifications thereof, it is to be clearly understood that this description is made only by way of example and not as a limitation on the scope of the invention.

What we claim is:

1. An electric crystal rectifier comprising a semiconducting body of given conductivity type, a first electrode making low resistance contact with the said body, the body having been subjected to an electroforming treatment in order to produce a layer of the opposite conductivity type on part of the exposed surface of the body, and a thin film of the given conductivity type over part of the said layer, and a second electrode making contact with the said thin film, the two electrodes being spaced apart by a distance $d=k\sqrt{T}$ where T is the lifetime of current carriers in the semiconducting body, and $k$ is substantially a constant, the value of which depends upon the said electroforming treatment, and upon the reverse turnover voltage required for the rectifier.

2. An electric crystal rectifier comprising a semiconducting body of N-type conductivity, a first electrode making low resistance contact with the said body, the body having been subjected to an electroforming treatment in order to produce a layer of P-type conductivity on part of the exposed surface of the body, and a thin film of N-type conductivity over part of the said layer, and a second electrode making contact with the said thin film, the two electrodes being spaced apart by a distance $d=k\sqrt{T}$, where T is the lifetime of positive holes in the semiconducting body, and $k$ is substantially a constant, the value of which depends upon the said electroforming treatment and upon the reverse turnover voltage required for the rectifier.

3. A rectifier according to claim 1 comprising a slice of a semi-conducting crystal having a V-groove cut across one surface thereof, a first electrode consisting of a metal coating over the said surface extending as far as the edges of the groove, and a second electrode consisting of a wire, the point of which makes contact with the flanks of the groove, a layer and superposed film being formed on the semiconductor surface under each point of contact between the said wire and the flanks of the groove.

4. A rectifier according to claim 3 comprising a metal base making contact with surface of the said slice opposite to the first-mentioned surface, the said coating extending over the edge of the slice and over the base to make electrical contact therewith.

5. A rectifier according to claim 1 in which the said semiconducting body comprises a slice of a semiconducting crystal having the said layer on one surface thereof, and a metal base making contact with the opposite surface, and in which the first electrode comprises a metal coating on part of the first-mentioned surface and extending over the edge of the slice and over the base to make electrical contact therewith.

6. A rectifier according to claim 1, in which the said second electrode comprises a sharply pointed wire making substantially point contact with the said thin film.

7. A rectifier according to claim 1, in which the said second electrode comprises a metal film deposited on the said thin film.

8. A rectifier according to claim 1 comprising a slice of a semiconducting crystal with parallel faces, and having a thickness equal to $d$, in which the said first electrode makes low resistance contact with one of the said faces, and in which the said layer covers part of the other of the said faces.

9. A rectifier according to claim 1 comprising a slice of a semiconducting crystal having a substantially plane face, and a recess cut in the opposite face, the bottom of which recess is parallel to the first-mentioned face and is spaced therefrom by a distance equal to $d$, in which the said electrode makes low resistance contact with the first-mentioned face, and in which the said layer covers part of the bottom of the said recess.

10. A rectifier according to claim 5 in which the semiconducting body or crystal is a crystal of N-type germanium.

References Cited in the file of this patent

UNITED STATES PATENTS

| | | |
|---|---|---|
| 2,524,033 | Bardeen | Oct. 3, 1950 |
| 2,563,503 | Wallace | Aug. 7, 1951 |
| 2,629,767 | Nelson et al. | Feb. 24, 1953 |
| 2,646,609 | Heins | July 28, 1953 |